P. Przibil,
Band Saw Mill.
No. 113,926.  Patented Apr. 18, 1871.
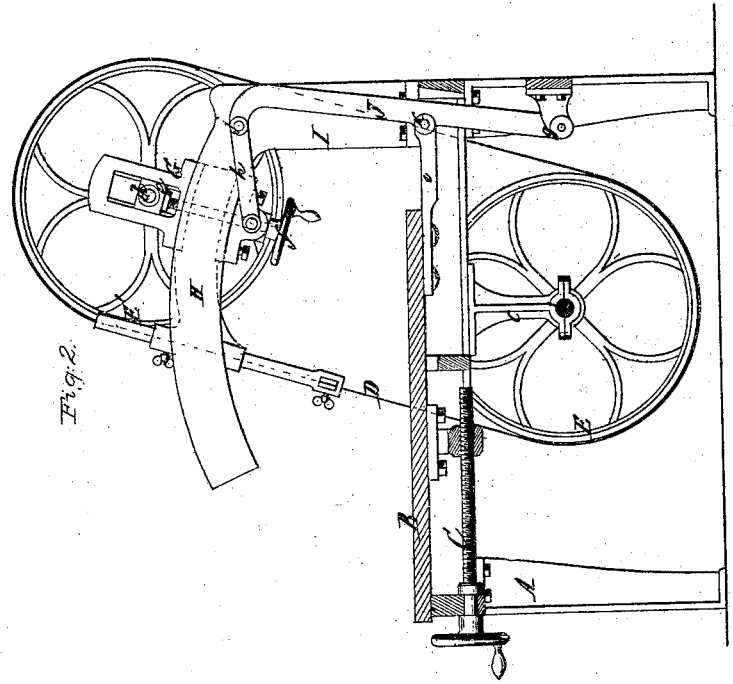
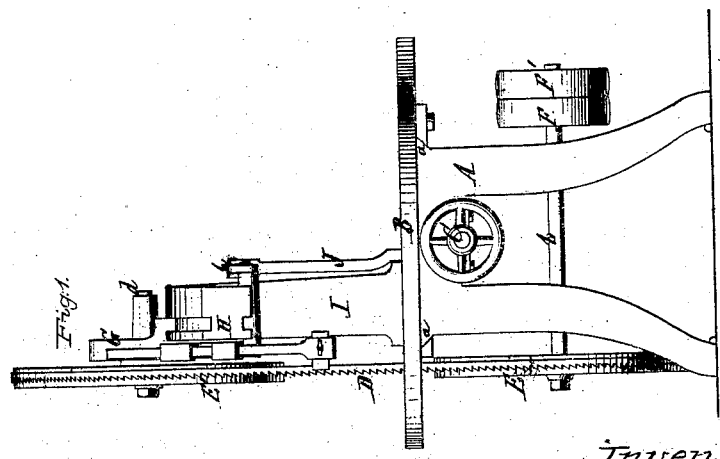
Witnesses.  
C. Wahlers  
E. Bilhuber
Inventor.  
Paul Przibil  
Van Santvoord & Hauff
attys.

United States Patent Office.

PAUL PRYIBIL, OF NEW YORK, N. Y.

Letters Patent No. 113,926, dated April 18, 1871.

IMPROVEMENT IN SAWING-MACHINES.

The Schedule referred to in these Letters Patent and making part of the same.

*To all whom it may concern:*

Be it known that I, PAUL PRYIBIL, of the city, county, and State of New York, have invented a new and useful Improvement in Sawing-Machines; and I do hereby declare the following to be a full, clear, and exact description thereof, which will enable those skilled in the art to make and use the same, reference being had to the accompanying drawing forming part of this specification, in which drawing—

Figure 1 represents a front view of this invention.

Figure 2 is a longitudinal vertical section of the same.

Similar letters indicate corresponding parts.

This invention relates to a sawing-machine carrying an endless or band-saw, the bearings of the drums on which the saw runs being so constructed that either one or both can be moved so as to bring the cutting part of the saw in an oblique position for the purpose of cutting at any desired angle or bevel.

The box which supports the movable drum is fitted on a segmental arm, the center of which coincides with the center of the stationary drum, and it connects with a lever, and through this lever with the table, while the table is made to slide on suitable ways in such a manner that, by moving the table on its ways, the movable drum is caused to move on the segmental arm, and the saw can be adjusted in the desired oblique or vertical position with little loss of time, while the table always remains in a horizontal position.

In the drawing—

The letter A designates a frame, made of cast-iron or other suitable material.

The upper surface of this frame forms guide-ways *a* for the table B, and a hand-screw, C, serves to move the table back and forth on these guide-ways.

D is the endless band-saw, which is stretched over two drums, E and E'.

The drum E is mounted on the end of a shaft, *b*, which has its bearings in hangers *c* secured to the frame A, and on this shaft are mounted the fast-and-loose pulleys F F'.

A belt running over the fast-pulley F serves to impart the required motion to the saw.

The upper drum E' is mounted on a shaft, *d*, which has its bearing in a box, *e*, fitted in a pillow-block, G, so that it can be moved up or down by means of a set-screw, *f*, for the purpose of stretching the saw to the requisite degree.

The pillow-block G is fitted on a segmental arm, H, which extends from a standard, I, rising from the end of the frame A; and the curve of said segmental arm is described from a center which coincides with that of the lower drum E, so that the pillow-block can be moved thereon without changing the tension of the saw or stopping the machine from running while changing the bevel, and that by moving the saw while the sawing proceeds a warped or twist cut can be produced.

The motion of the pillow-block on the segmental arm is produced by a lever, J, which has its fulcrum on a pivot, *g*, (see fig. 2,) and which connects by a link, *h*, with the pillow-block, and by a rod, *i*, with the table B.

The link *h* is connected to the lever J by a pivot, *j*, and the rod *i* by a pivot, *k*; and the respective distances of these pivots from the fulcrum of the lever are so proportioned that the motion of the table and of the upper drum correspond to their respective distances from the center of the lower or stationary drum, and that when the upper drum is moved the saw does not bind in the opening in the table.

It is obvious that the bearings of the upper drum may be made stationary and that of the lower movable; or, if desired, the bearings of both drums may be made movable round a common center.

By these means the table remains always in a horizontal position, while the saw can be readily adjusted to any desired angle without changing its tension, and the workman is enabled to cut the wood to any desired angle or bevel with the same ease as he can cut it square.

What I claim as new, and desire to secure by Letters Patent, is—

1. In a band sawing-machine, the combination of a table moving on horizontal guide-ways with two drums, E E', carrying the saw, the bearings of one of which is made movable upon the fixed segment H, the table and one drum being connected by suitable means, as herein shown and described.

2. The lever J, connecting by a link, *h*, with the pillow-block G of the drum E', and by a rod, *i*, with the table B, in combination with a hand-screw, C, acting on the table B, substantially in the manner herein set forth.

PAUL PRYIBIL.

Witnesses:
W. HAUFF,
E. F. KASTENHUBER.